(12) United States Patent
Valiulis (10) Patent No.: US 8,800,946 B2
(45) Date of Patent: Aug. 12, 2014

(54) RETAIL MERCHANDISE DISPLAY CLIP

(71) Applicant: Thomas E. Valiulis, Rockford, IL (US)

(72) Inventor: Thomas E. Valiulis, Rockford, IL (US)

(73) Assignee: Southern Imperial, Inc., Rockford, IL (US)

( * ) Notice: Subject to any disclaimer, the term of this patent is extended or adjusted under 35 U.S.C. 154(b) by 0 days.

(21) Appl. No.: 13/692,354

(22) Filed: Dec. 3, 2012

(65) Prior Publication Data
US 2014/0150217 A1    Jun. 5, 2014

(51) Int. Cl.
*A47G 1/10* (2006.01)
*F16M 11/08* (2006.01)

(52) U.S. Cl.
CPC .................................. *F16M 11/08* (2013.01)
USPC .................... 248/316.7; 248/225.21; 24/545; 24/3.12; 24/67.9; 211/57.1; 211/59.1

(58) Field of Classification Search
USPC ............... 248/316.7, 220.21, 220.31, 225.21, 248/489, 316.5, 316.1, 495; 211/57.1, 59.1; 40/658, 648, 651, 642.01, 661
See application file for complete search history.

(56) References Cited

U.S. PATENT DOCUMENTS

| | | | | |
|---|---|---|---|---|
| 2,038,043 A | * | 4/1936 | Hasselblad | 248/316.5 |
| 3,452,457 A | * | 7/1969 | Jones et al. | 36/50.1 |
| 4,962,905 A | * | 10/1990 | Friend et al. | 248/125.2 |
| 5,364,057 A | * | 11/1994 | Pynenburg | 248/475.1 |
| 5,384,935 A | * | 1/1995 | Maier-Hunke et al. | 24/67 R |
| 5,396,722 A | * | 3/1995 | Ostrovsky | 40/796 |
| 5,640,742 A | * | 6/1997 | White et al. | 24/3.12 |
| 6,088,942 A | * | 7/2000 | Brooks et al. | 40/603 |
| 6,233,859 B1 | * | 5/2001 | Kilpatrick et al. | 40/790 |
| 6,269,571 B1 | * | 8/2001 | Thalenfeld | 40/642.01 |
| 6,389,722 B1 | * | 5/2002 | Josefsson et al. | 40/642.01 |
| 6,416,028 B1 | * | 7/2002 | Miller et al. | 248/339 |
| 6,467,742 B1 | * | 10/2002 | Pitcher | 248/205.3 |
| 7,089,695 B2 | * | 8/2006 | Fast et al. | 40/642.01 |
| D601,411 S | * | 10/2009 | Barkdoll et al. | D8/395 |
| 8,393,101 B2 | * | 3/2013 | Knight et al. | 40/611.12 |
| 2008/0047910 A1 | * | 2/2008 | Kubota | 211/59.1 |
| 2009/0260192 A1 | * | 10/2009 | Mccarthy | 24/3.12 |

* cited by examiner

*Primary Examiner* — Nkeisha Smith
(74) *Attorney, Agent, or Firm* — Reinhart Boerner Van Deuren P.C.

(57) ABSTRACT

A retail display clip is provided. The retail display clip includes a stationary clip base and a rotatable clip member that rotates about an axis of rotation. The rotatable clip member rotates relative to the clip base. The retail display clip includes an open state and a closed state. As the rotatable clip member rotates from the open to the closed or the closed to the open state, an over-center point is transitioned. The over-center point is created by the interaction between a locking tab of the rotatable clip member and a flat inner surface of the clip base. In the closed stated, a torque is created by the over-center point that causes the locking tab to place a force on the flat inner surface of the clip base. A gripping point is formed at the location where the locking tab places the force. The gripping point supports retail merchandise.

14 Claims, 6 Drawing Sheets

RETAIL MERCHANDISE DISPLAY CLIP

FIELD OF THE INVENTION

This invention generally relates to the retail display industry, and more particularly to clips useful to hang retail merchandise.

BACKGROUND OF THE INVENTION

Many products in the retail industry include merchandise to be displayed in a store environment. The merchandise is typically displayed on gondola shelf edge, shelf channels, flat surfaces, ceilings, and any other structures typically found in the store environment. A primary concern regarding this merchandise is to be able to reliably display the sign without concern for the sign falling.

Typically, to prevent signs from falling, retailers will place holes inside of the sign in order to securely attach the sign to a sign holder. However, while placing the holes in the sign does create a secure hold on the sign, this is not desirable because it damages the sign. Specifically, putting holes in the sign increases the chance that the sign will tear over the useful lifetime of the sign.

Therefore, there is a need for a retail display clip to display merchandise in a reliable way without causing damage to the sign to be displayed. The invention provides such a retail display clip. These and other advantages of the invention, as well as additional inventive features, will be apparent from the description of the invention provided herein.

BRIEF SUMMARY OF THE INVENTION

In one aspect, the invention provides a retail securing clip including a clip head and a clip body. The clip head includes a rotatable clip member and a clip base. The rotatable clip member rotates relative to the clip base about an axis of rotation and includes a locking tab located proximal to the clip base. The clip head is attached to the clip body at an interface of the clip head and the clip body. The rotatable clip member rotates about the axis of rotation between an open state and a closed state. As the rotatable clip member rotates from the closed to the open state or from the open to the closed stated, it transitions through an over-center point. In the closed position, the over-center point meets the clip base thereby creating a torque that causes the locking tab to place a force on the clip base.

In another aspect, the invention provides a retail securing clip including a clip head and a clip body. The clip head includes a rotatable clip member and a clip base. The rotatable clip member rotates relative to the clip base about an axis of rotation and includes a locking tab located proximal to the clip base at a flat surface of the clip base. The clip head is attached to the clip body at an interface of the clip head and the clip body.

In a further aspect, the rotatable clip member rotates about the axis of rotation between an open state and a closed state. In the open state, a space is formed between the rotatable clip member and the clip base with the only point of contact between the rotatable clip member and the flat surface of the clip base being a gripping ridge of the locking tab. In the closed state, a gripping point is formed between the locking tab and the flat surface of the clip base.

In yet another aspect, the invention provides a retail display device for displaying retail merchandise. The retail display device includes a retail display clip with a clip head, a clip body, and a mounting structure. The clip head includes a rotatable clip member and a clip base. The rotatable clip member rotates relative to the clip base about an axis of rotation. The rotatable clip member includes a locking tab located proximal to the clip base at a flat surface of the clip base. The clip head is attached to the clip body at an interface of the clip head and the clip body. The rotatable clip member rotates about the axis of rotation between an open state and a closed state. In the open state, a space is formed between the rotatable clip member and the clip base with the only point of contact between the rotatable clip member and the flat surface of the clip base being a gripping ridge of the locking tab. In the closed state, a gripping point is formed between the locking tab and the flat surface of the clip base. As the rotatable clip member rotates from the closed to the open state or from the open to the closed stated it transitions through an over-center point. In the closed position, the over-center point meets the clip base thereby creating a torque that causes the locking tab to place a force on the clip base. The mounting structure extends from the clip body and is configured to support the retail display clip.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
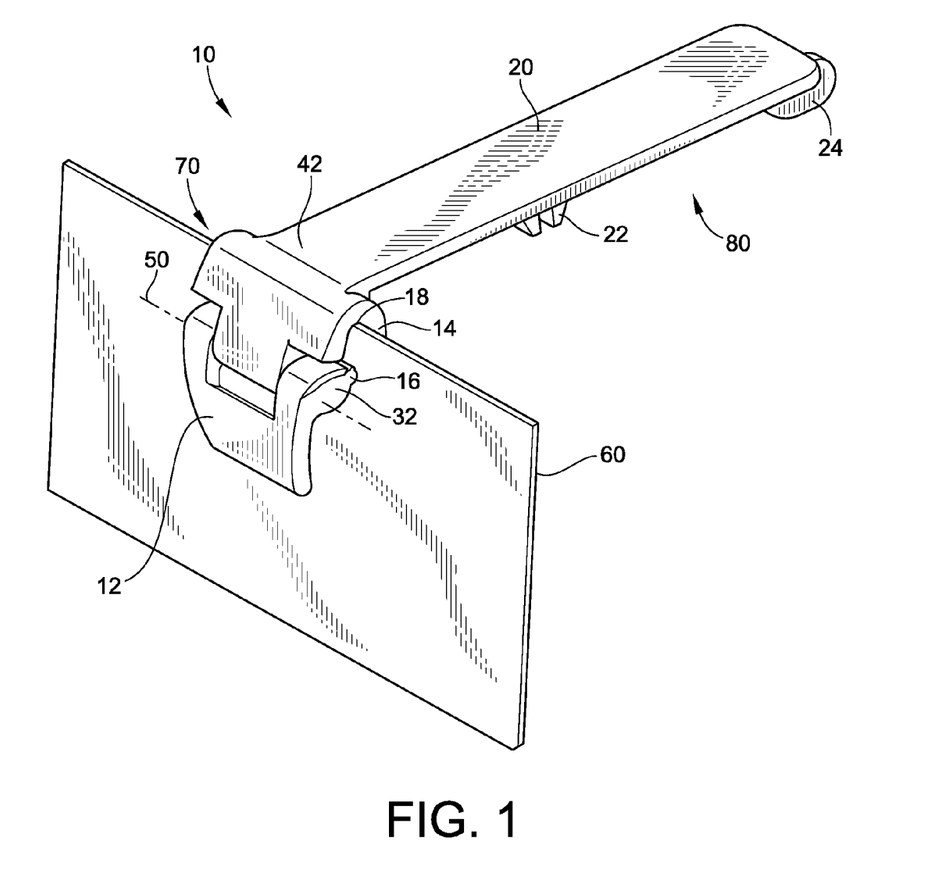
FIG. 1 is an isometric perspective view of a retail merchandise sign clip in accordance with an embodiment of the present invention.

FIG. 1 illustrates a retail signage or merchandise clip 10. Clip 10 includes a clip head 70 and a clip body 20. The clip head 70 is attached to the clip body 20 at a connecting interface 42. The clip head 70 functions to secure or retain retail merchandise or signage 60.

Further, the clip head 70 includes two primary components. The first component is a rotatable clip member 12, and the second component is a clip base 14. The rotatable clip member 12 rotates about an axis of rotation 50. The clip member 12 further includes a locking tab 16 that protrudes from a clip member base 32. The locking tab 16 interacts with an inner surface 18 of the clip base 14 to apply a gripping force on the retail signage 60.

The clip body 20 includes mounting structure 80. In the embodiment illustrated in FIG. 1, the mounting structure 80 includes a wedge clip 22 and a support tab 24. The wedge clip 22 and the support tab 24 interact with corresponding structure on a display surface in order to maintain a location of the retail merchandise clip 10.

Figure 2:
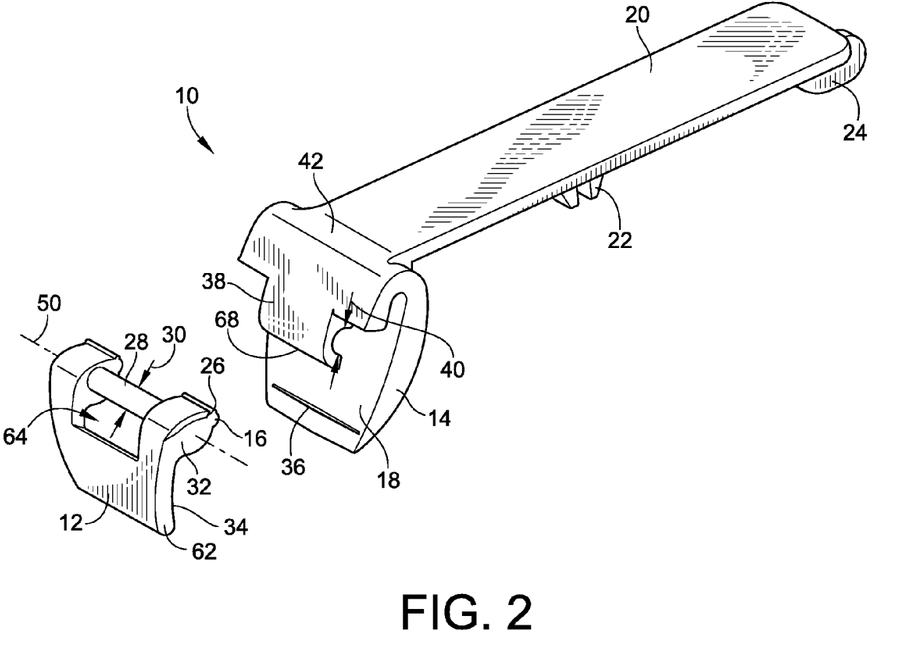
FIG. 2 is an exploded view of the clip of FIG. 1.

FIG. 2 illustrates an exploded view of the retail merchandise clip 10 of FIG. 1. From this perspective, a mounting bar 28 of the rotatable clip member 12 is shown. The mounting bar 28 extends through the axis of rotation 50 and includes a diameter 30, which is smaller than a diameter of the clip member base 32.

Furthermore, the locking tab 16 of the clip member base 32 includes a gripping ridge 26. The gripping ridge 26 acts to limit the open space between the locking tab 16 and the inner surface 18 when the clip 12 is in the open position (see FIG. 3). The gripping ridge 26 applies a minor force to secure the retail signage 60 (see FIG. 1) such that the retail signage 60 is not easily repositioned while the clip member 12 is in an unlocked position. Also, the gripping ridge 26 acts to grip the signage 60 when the clip member 12 is in a locked position. In this manner, if the signage 60 is bumped, the clip member 12 may try to open, but the gripping ridge 26 will prevent the clip member 12 from opening and releasing the signage 60.

Additionally, the rotatable clip member 12 includes a curved inner surface 34. The curved inner surface 34 begins at the clip member base 32 and terminates at a distal gripping surface 62 of the clip member 12. Typically, the curved inner surface 34 has a radius of curvature of 0.665 inches. However, the radius of curvature can be between 0.5 and 1.0 inches.

Further, the rotatable clip member 12 includes a reciprocal gap 64 disposed in the space around the mounting bar 28. The gap 64 is formed because of the smaller diameter 30 of the mounting bar 28. Also, the gap 64 allows for a support member 38 of the clip base 14 to grip the mounting bar 28 of the clip member 12.

The support member 38 is arranged to rotatably support the rotatable clip member 12 on the retail merchandise clip 10. The support member 38 extends generally parallel to the inner surface 18 of the clip base 14. Also, the support member 38 inner half-cylinder surface 68, which is configured to snap lock with the mounting bar 28 of the rotatable clip member 12. The inner half-cylinder surface 68 defines a diameter 40 that is sized so as to accept the mounting bar 28 within space formed by the inner half-cylinder surface 68. The grip applied to the mounting bar 28 by the inner half-cylinder surface 68 is such that rotation of the rotatable clip member 12 is not prevented.

Furthermore, the inner surface 18 of the clip base 14 is generally a flat surface that extends from a position proximate the interface 42 to an end point proximate the distal gripping surface 62 of the clip member 12. The inner surface 18 also includes a gripping ridge 36 that interacts with the distal gripping surface 62 of the clip member 12, when the retail merchandise clip 10 is in a closed or locked position.

Figure 3:
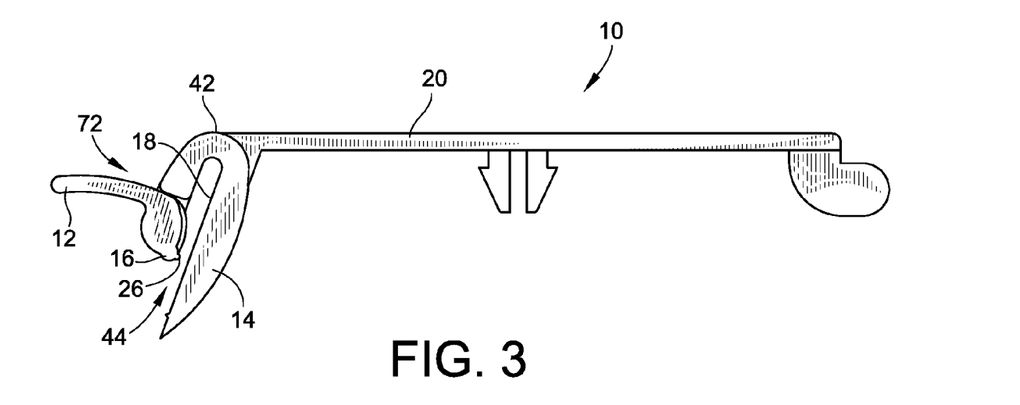
FIG. 3 is a profile view of the retail merchandise sign clip of FIG. 1 in an open position.

FIG. 3 illustrates the retail merchandise clip 10 in an open position. In the open position, the rotatable clip member 12 is rotated about axis 50 (see FIG. 1) away from the inner surface 18 of the clip base 14. In this position, a generally open cavity 44 is formed in the space disposed between the rotatable clip member 12 and the clip base 14. The open cavity 44 is sized such that retail signage 60 (see FIG. 1) is able to be inserted into the cavity 44 while the clip head 70 is in the open position.

Figure 4:
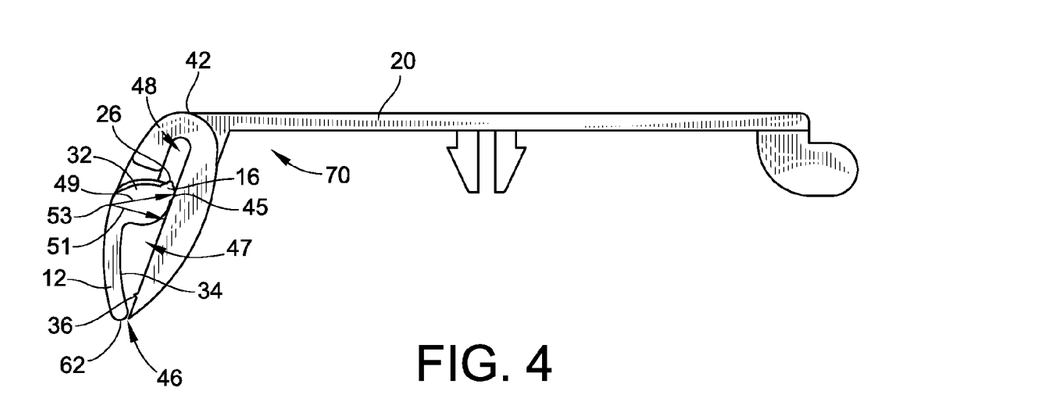
FIG. 4 is a profile view of the retail merchandise sign clip of FIG. 1 in a closed position.

FIG. 4 illustrates the retail merchandise clip 10 in a locked or closed position. In the closed position, the open cavity 44 (see FIG. 3) is divided in two by the clip member base 32 and the locking tab 16. This creates an upper cavity 48 and a lower cavity 47. The upper cavity 48 in bounded by the interface 42 on an upper end and a first gripping point 45 formed between the locking tab 16 and the inner surface 18 of the clip base 14. The lower cavity 47 is bounded by the first gripping point 45 on the upper end and by a second gripping point 46 on the lower end.

The first gripping point 45 is created because the locking tab 16 is positioned and sized such that clip base 32 includes a first width 49 and a second width 51 both extending from a point of origin 53 on the outer surface of the clip base 32. The first width 49 spans across the clip base 32 to an outer surface of the locking tab 16. The second width 51 spans from the same point of origin 53 as the first width 49 across the clip base 32 to an outer surface of the clip base 32 proximate the inner surface 18 of the clip base 14.

Further, the second width 51 defines a distance between the point of origin 53 and inner surface 18 that is normal to the inner surface 18, when the rotatable clip member 12 is in the closed position. Further, the width 49 is angularly offset from the width 51 such that the locking tab 16 prevents the rotatable clip member 12 from being easily rotated from the closed position. The locking tab 16 prevents this rotation because it interferes with the inner surface 18, and the width 49 is longer than width 51.

As such, the first gripping point 45 defines an over center point between the locking tab 16 and the clip base 14. As the clip member 12 is rotated from open to closed, the locking tab 16 will transition this over-center point such that, in the closed position, the over center point creates a torque that causes the locking tab 16 to apply a force on the inner surface 18 thereby creating the first gripping point 45.

Indeed, to rotate the clip member 12, a force must be applied such that the locking tab 16 is forced to overcome the torque created by the over-center point. Generally, the inner surface 18 of the clip base 14 is made from a compliant material such that the locking tab 16 can be rotated even though the width 49 is great enough to prevent this rotation without a sufficient force.

The second gripping point 46 is formed between the distal gripping surface 36 of the clip base 14 and the distal gripping surface 62 of the rotatable clip member 12. This second gripping point 46 may provide additional securing support, or merely act to stabilize the signage 60 while being retained within the clip 10 by the first gripping point 45.

Figure 5:
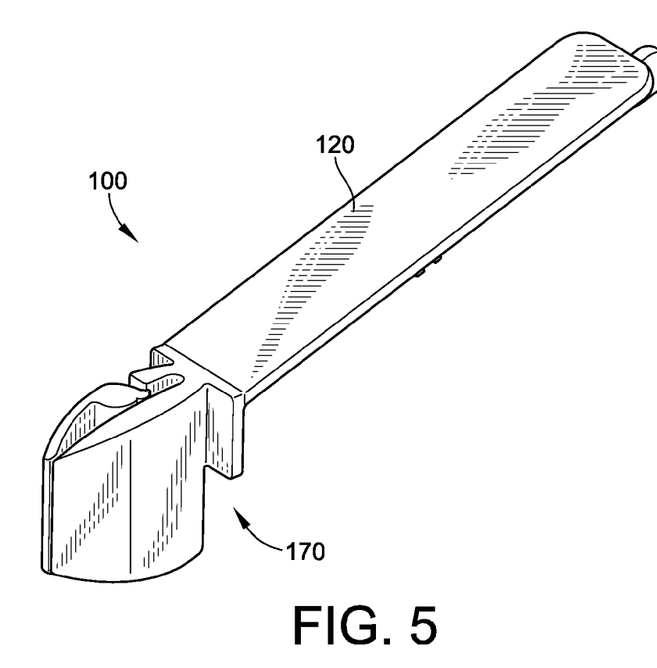
FIG. 5 is an isometric view of the clip of FIG. 1 with the clip head rotated 90 degrees.

FIG. 5 illustrated another embodiment of the invention in a clip 100, which is similar to clips 10 from FIGS. 1-4 but with the clip head 170 rotated 90 degrees in the counterclockwise direction relative to a base 120. While FIG. 5 shows a 90 degree rotation in the counter clockwise direction, any angle orientation is contemplated.

Figure 6:
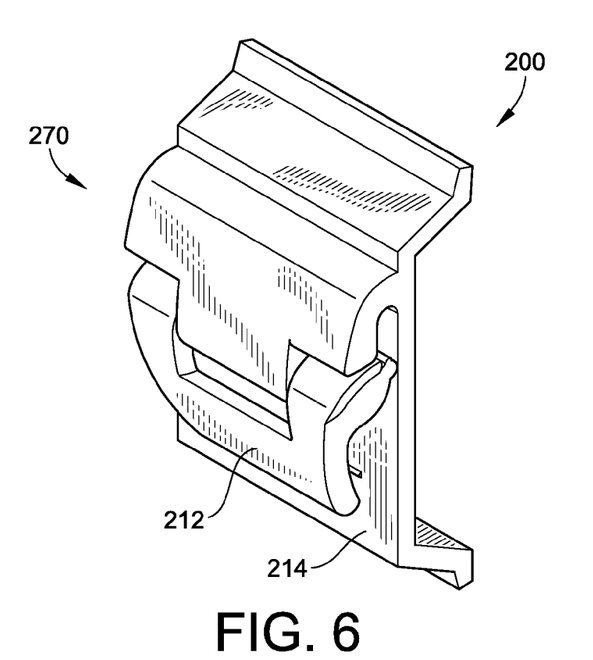
FIG. 6 is an isometric perspective view of a retail merchandise sign clip in accordance with an embodiment of the present invention.

FIG. 6 illustrates another embodiment of the invention in a clip 200, which includes a clip head 270 formed from a clip member 212 attached to a sliding base 214. Base 214 interacts with specific retail store shelving to secure the clip 200 in the retail environment.

Figure 7:
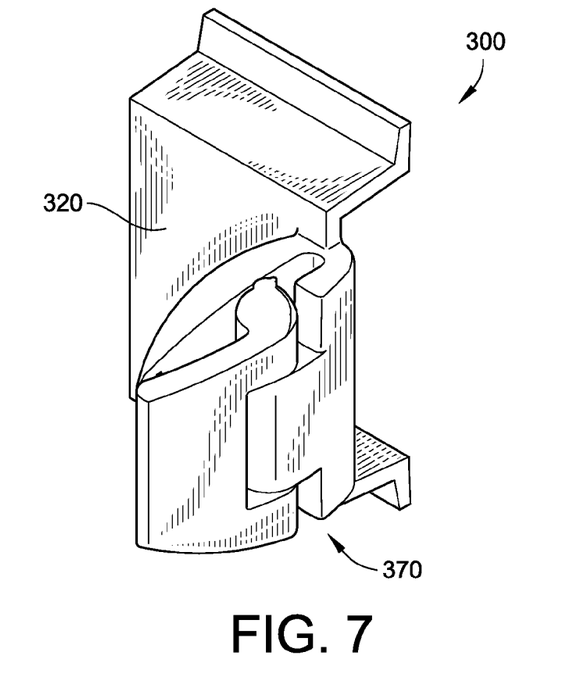
FIG. 7 is an isometric perspective view of a retail merchandise sign clip in accordance with an embodiment of the present invention.

FIG. 7 illustrates a clip head 370 similar to clip head 70 from FIGS. 1-4 but mounted to a sliding clip body 320.

Sliding clip body 320 interacts with specific retail store shelving to secure the clip 300 in the retail environment.

Figure 8:
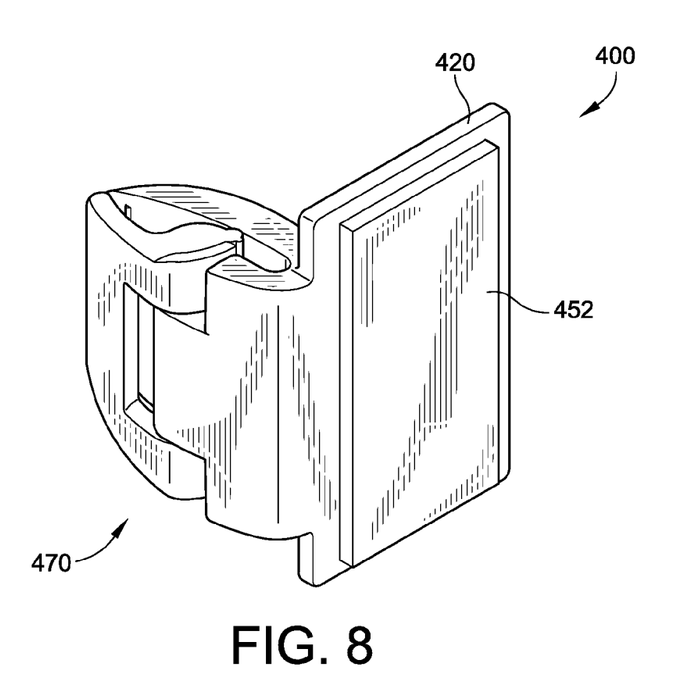
FIG. 8 is an isometric perspective view of a retail merchandise sign clip in accordance with an embodiment of the present invention.

FIG. 8 illustrates an embodiment of the invention in a clip 400. Clip 400 includes a clip head 470 attached to a mounting base 420. Mounting base 420 is a flat surface with an adhesive pad 452 that acts to secure the clip 400 in the retail merchandise environment.

Figure 9:
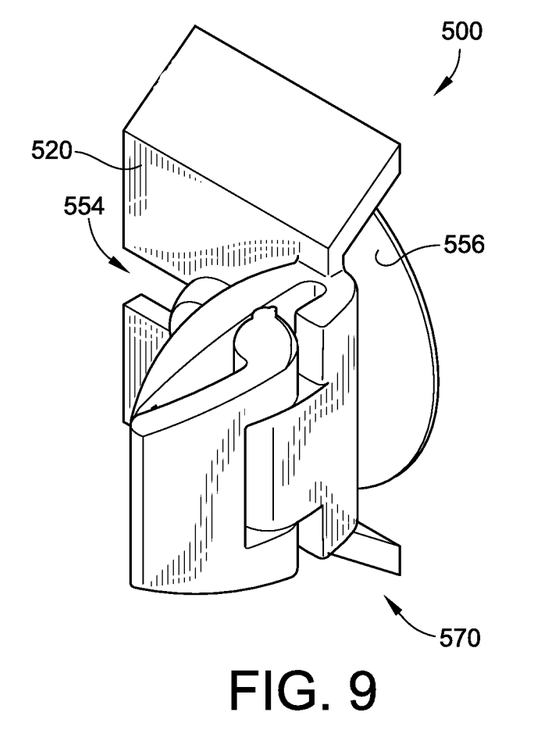
FIG. 9 is an isometric perspective view of a retail merchandise sign clip in accordance with an embodiment of the present invention.

FIG. 9 illustrates an embodiment of the invention in a clip 500. Clip 500 includes a clip head 570 attached to a base 520. Base 520 includes a slot 554 that receives a suction cup 556. The suction cup 556 supports the clip 500 in the retail merchandise environment.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A retail securing clip, comprising:
   a clip head, the clip head includes a rotatable clip member and a clip base, the clip base defining a cavity with a closed rounded end, the rotatable clip member rotates relative to the clip base about an axis of rotation, the rotatable clip member includes a locking tab having a rounded outer surface located proximal to the clip base;
   a clip body, the clip head is attached to the clip body at an interface of the clip head and the clip body;
   wherein the rotatable clip member rotates about the axis of rotation between an open state and a closed state, as the rotatable clip member rotates from the closed to the open state or from the open to the closed it transitions through an over-center point, in the closed state the over-center point meets the clip base thereby creating a torque that causes the locking tab to place a force on the clip base; and
   wherein the locking tab projects into the cavity toward the closed rounded end in the closed state;
   further comprising a gripping ridge which projects radially outward from the rounded outer surface of the locking tab, the gripping ridge projecting toward the closed rounded end of the cavity in the closed state.

2. The retail securing clip of claim 1, wherein the rotatable clip member includes a rotatable clip member base and the locking tab protrudes from the rotatable clip member base.

3. The retail securing clip of claim 2, wherein the clip base includes an inner surface that is flat and faces the rotatable clip member.

4. The retail securing clip of claim 2, wherein the rotatable clip member includes a curved inner surface that extends from the rotatable clip member base to a distal end of the rotatable clip member and has a radius of curvature of between 0.5 and 1.0 inch.

5. The retail securing clip of claim 4, further comprising a first gripping point between the locking tab and an inner surface of the clip base and a second gripping point between the distal end of the rotatable clip member and the inner surface of the clip base when the rotatable clip member is in the closed state.

6. The retail securing clip of claim 2, wherein the rotatable clip member base defines a mounting bar, the mounting bar mates with a support member, the support member is attached to the clip base and is arranged to rotatably support the mounting bar of the rotatable clip member base.

7. The retail securing clip of claim 1, further comprising a mounting structure that extends from the clip body, the mounting structure is configured to support the retail securing clip.

8. A retail securing clip, comprising:
   a clip head, the clip head includes a rotatable clip member and a clip base defining a cavity with a closed rounded end, the rotatable clip member rotates relative to the clip base about an axis of rotation, the rotatable clip member includes a locking tab having a rounded outer surface located proximal to the clip base at a flat surface of the clip base;
   a clip body, the clip head is attached to the clip body at an interface of the clip head and the clip body;
   wherein the rotatable clip member rotates about the axis of rotation between an open state and a closed state, in the open state a space is formed between the rotatable clip member and the clip base, wherein the locking tab projects into the cavity toward the closed rounded end in the closed state, and wherein a gripping ridge projects radially outward from the rounded outer surface of the locking tab such that the gripping ridge projects towards the closed rounded end of the cavity of the clip base; and
   further comprising an over-center point and as the rotatable clip member rotates from the closed to the open state or from the open to the closed state it transitions through the over-center point, in the closed state the over-center point meets the clip base thereby creating a torque that causes the locking tab to place a force on the clip base.

9. The retail securing clip of claim 8, wherein the rotatable clip member includes a rotatable clip member base and the locking tab protrudes from the rotatable clip member base.

10. The retail securing clip of claim 9, wherein the rotatable clip member includes a curved inner surface that extends from the rotatable clip member base to a distal end of the rotatable clip member and has a radius of curvature of between 0.5 and 1.0 inch.

11. The retail securing clip of claim 8, further comprising a gripping point between the distal end of the rotatable clip member and an inner surface of the clip base when the rotatable clip member is in the closed state.

12. The retail securing clip of claim 8, wherein the rotatable clip member base defines a mounting bar, the mounting bar mates with a support member, the support member is attached to the clip base and is arranged to rotatably support the mounting bar of the rotatable clip member base.

13. The retail securing clip of claim 8, further comprising a mounting structure that extends from the clip body, the mounting structure is configured to support the retail securing clip.

14. A retail display device, comprising
   a retail display clip, comprising:
      a clip head, the clip head includes a rotatable clip member and a clip base, the clip base defining a cavity having a closed rounded end, the rotatable clip member rotates relative to the clip base about an axis of rotation, the rotatable clip member includes a locking tab having a rounded outer surface located proximal to the clip base at a flat surface of the clip base;
      a clip body, the clip head is attached to the clip body at an interface of the clip head and the clip body;
      wherein the rotatable clip member rotates about the axis of rotation between an open state and a closed state, in the open state a space is formed between the rotatable clip member and the clip base, wherein the locking tab projects into the cavity toward the closed rounded end in the closed state, and wherein a gripping ridge projects radially outward from the rounded outer surface of the locking tab towards the closed rounded end in the closed state; as the rotatable clip member rotates from the closed to the open state or from the open to the closed state it transitions through an over-center point, in the closed state the over-center point meets the clip base thereby creating a torque that causes the locking tab to place a force on the clip base; and
   a mounting structure that extends from the clip body, the mounting structure is configured to support the retail display clip.

* * * * *

UNITED STATES PATENT AND TRADEMARK OFFICE
CERTIFICATE OF CORRECTION

| | | |
|---|---|---|
| PATENT NO. | : 8,800,946 B2 | Page 1 of 1 |
| APPLICATION NO. | : 13/692354 | |
| DATED | : August 12, 2014 | |
| INVENTOR(S) | : Thomas E. Valiulis | |

It is certified that error appears in the above-identified patent and that said Letters Patent is hereby corrected as shown below:

In the Claims

In Column 6, line 1, after the word "closed", insert the word --state--.

Signed and Sealed this
Seventh Day of July, 2015

Michelle K. Lee
*Director of the United States Patent and Trademark Office*